United States Patent
Cook et al.

(10) Patent No.: US 9,823,342 B2
(45) Date of Patent: Nov. 21, 2017

(54) SYSTEM AND METHOD FOR MOBILE MONITORING OF NON-ASSOCIATED TAGS

(75) Inventors: Joel Powell Cook, San Francisco, CA (US); Daniel Aljadeff, Kiriat Ono (IL)

(73) Assignee: AeroScout, Ltd., Rehovot (IL)

( * ) Notice: Subject to any disclaimer, the term of this patent is extended or adjusted under 35 U.S.C. 154(b) by 630 days.

(21) Appl. No.: 13/018,662

(22) Filed: Feb. 1, 2011

(65) Prior Publication Data

US 2011/0195701 A1   Aug. 11, 2011

Related U.S. Application Data

(60) Provisional application No. 61/302,623, filed on Feb. 9, 2010.

(51) Int. Cl.
| | |
|---|---|
| *H04W 24/00* | (2009.01) |
| *G01S 11/06* | (2006.01) |
| *G01S 5/00* | (2006.01) |
| *G01S 5/02* | (2010.01) |
| *G08B 21/02* | (2006.01) |
| *G08B 21/22* | (2006.01) |
| *G08B 25/08* | (2006.01) |
| *H04M 1/725* | (2006.01) |
| *H04Q 9/00* | (2006.01) |
| *H04W 88/06* | (2009.01) |
| *H04W 52/02* | (2009.01) |
| *H04W 88/04* | (2009.01) |

(Continued)

(52) U.S. Cl.
CPC ............. *G01S 11/06* (2013.01); *G01S 5/0018* (2013.01); *G01S 5/0289* (2013.01); *G08B 21/0227* (2013.01); *G08B 21/0247* (2013.01); *G08B 21/0275* (2013.01); *G08B 21/22* (2013.01); *G08B 25/08* (2013.01); *H04M 1/7253* (2013.01); *H04Q 9/00* (2013.01); *G01S 19/48* (2013.01); *H04M 1/72572* (2013.01); *H04M 2250/06* (2013.01); *H04Q 2209/43* (2013.01); *H04Q 2209/47* (2013.01); *H04Q 2209/826* (2013.01); *H04Q 2209/86* (2013.01); *H04W 4/008* (2013.01); *H04W 4/043* (2013.01); *H04W 52/0245* (2013.01); *H04W 88/04* (2013.01); *H04W 88/06* (2013.01)

(58) Field of Classification Search
CPC ....... H04W 4/02; H04W 64/00; H04W 8/005; H04W 84/18; H04W 74/00; H04W 4/023
USPC ........... 455/41.2, 41.3, 418–420, 455, 456.1, 455/456.4
See application file for complete search history.

(56) References Cited

U.S. PATENT DOCUMENTS

| 7,252,230 B1 * | 8/2007 | Sheikh et al. ............... 235/439 |
| 8,244,236 B2 * | 8/2012 | Roumeliotis et al. ........ 455/424 |

(Continued)

OTHER PUBLICATIONS

International Search Report and Written Opinion dated Mar. 30, 2011, which issued in corresponding International Application No. PCT/US11/23472 filed Feb. 2, 2011 (11 pages).

(Continued)

*Primary Examiner* — Charles Appiah
*Assistant Examiner* — Jaime Holliday
(74) *Attorney, Agent, or Firm* — Adan Ayala (57) ABSTRACT

A system for monitoring at least one tag device has at least one mobile cellular telephone. The mobile cellular telephone is capable of communicating on a WiFi network, wherein the at least one tag device transmits wireless data messages in a non-associating mode.

43 Claims, 4 Drawing Sheets (51) Int. Cl.
*H04W 4/04* (2009.01)
*H04W 4/00* (2009.01)
*G01S 19/48* (2010.01)

(56) References Cited

U.S. PATENT DOCUMENTS

| | | | | |
|---|---|---|---|---|
| 8,284,061 | B1* | 10/2012 | Dione | 340/572.1 |
| 2003/0007473 | A1* | 1/2003 | Strong et al. | 370/338 |
| 2003/0134657 | A1* | 7/2003 | Norta et al. | 455/550 |
| 2005/0207381 | A1* | 9/2005 | Aljadeff et al. | 370/338 |
| 2005/0253722 | A1* | 11/2005 | Droms et al. | 340/572.1 |
| 2006/0094405 | A1* | 5/2006 | Dupont | 455/414.1 |
| 2006/0158310 | A1* | 7/2006 | Klatsmanyi | G08B 13/2462 340/10.1 |
| 2007/0229264 | A1* | 10/2007 | Eveland | 340/572.1 |
| 2008/0042840 | A1* | 2/2008 | Christopher | 340/572.1 |
| 2008/0106399 | A1* | 5/2008 | Yaqub et al. | 340/539.11 |
| 2008/0130604 | A1* | 6/2008 | Boyd | 370/338 |
| 2008/0174405 | A1* | 7/2008 | Toorn | 340/10.1 |
| 2008/0204248 | A1* | 8/2008 | Cam Winget et al. | 340/572.4 |
| 2009/0036104 | A1 | 2/2009 | Malik | |
| 2009/0040048 | A1 | 2/2009 | Locker et al. | |
| 2009/0160673 | A1 | 6/2009 | Cirker | |
| 2009/0170484 | A1* | 7/2009 | Bayley et al. | 455/414.2 |
| 2009/0207824 | A1 | 8/2009 | Lee et al. | |
| 2009/0219132 | A1* | 9/2009 | Maytal | G06Q 30/018 340/5.8 |
| 2010/0003918 | A1* | 1/2010 | Malik | 455/41.2 |
| 2010/0161434 | A1* | 6/2010 | Herwig et al. | 705/20 |

OTHER PUBLICATIONS

Guido R. Hiertz, et al., IEEE 802.11s: WLAN Mesh Standardization and High Performance Extensions, IEEENetwork, IEEE Service Center, May 31, 2008-Dec. 31, 2008, vol. 22, No. 3, New York, New York.

Mustafa Abdat et al., Survey on Indoor Wireless Positioning Techniques: Towards Adaptive Systems, 2010 International Conference on Distributed Frameworks for Multimedia Applications, Jan. 1, 2010, pp. 1-5.

Andrew Coffa, Supplementary European Search Report, Sep. 7, 2017, Munich, Germany.

Annex to the European Search Report on European Patent Application No. EP11742631, Aug. 30, 2017.

* cited by examiner

SYSTEM AND METHOD FOR MOBILE MONITORING OF NON-ASSOCIATED TAGS

RELATED PATENT APPLICATIONS

The present provisional application is related to U.S. Provisional Patent Application filed Feb. 9, 2010, having U.S. Ser. No. 61/302,623, in the name of the same inventors, and which is incorporated herein by reference in its entirety. The present application further claims the benefit of the aforementioned.

The present application is further related to U.S. Pat. No. 7,295,115 entitled "RADIO-FREQUENCY IDENTIFICATION (RFID) TAG EMPLOYING UNIQUE RECEPTION WINDOW AND METHOD THEREFOR", filed on Feb. 16, 2005 and issued on Nov. 13, 2007; U.S. Pat. No. 6,963,289, entitled "WIRELESS LOCAL AREA NETWORK (WLAN) CHANNEL RADIO-FREQUENCY IDENTIFICATION (RFID) TAG SYSTEM AND METHOD THEREFORE", filed on Oct. 18, 2002 and issued on Nov. 8, 2005; and U.S. Pat. No. 7,522,049, entitled "Wireless Local Area Network (WLAN) Method and System for Presence Detection and Location Finding", filed on May 9, 2005 and issued on Apr. 21, 2009; the specifications of which are herein incorporated by reference.

FIELD OF THE INVENTION

The present invention relates to data communication between tags, mobile wireless units and location systems, and more specifically, to the mobile monitoring, processing and data relaying of non-associating tags by cell phones.

BACKGROUND OF THE INVENTION

A multitude of wireless communications systems are in common use today. Mobile telephones, pagers and wireless-connected computing devices such as personal digital assistants (PDAs) and laptop computers provide portable communications at virtually any locality. Wireless local area networks (WLANs) and wireless personal area networks (WPANs) according to the Institute of Electrical and Electronic Engineers (IEEE) specifications 802.11 (WLAN) (including 802.11a, 802.11b, 802.11g, 802.11n, etc.) which are generally known as Wi-Fi networks, 802.15.1 (WPAN) and 802.15.4 (WPAN-LR) also provide wireless interconnection of computing devices and personal communications devices, as well as other devices such as home automation devices.

Within the above-listed networks and wireless networks in general, in many personal, commercial and industrial applications it is desirable to monitor wireless devices and RFID tags and also know their location.

The usage of Wi-Fi tags has significantly increased during the last five years and they are now being used in many applications including healthcare, manufacturing, logistics, retail, oil & gas, etc.

These tags may include non-associating (beaconing) tags such as those manufactured and sold by AeroScout. The characteristics of this type of tags include very low channel capacity utilization, long battery life and compatibility both with Wi-Fi access points and Time of Arrival (TOA) receivers. They can have the ability to receive messages from various types of Exciters including Low Frequency and Ultrasound, causing the tags to send immediate messages to the Real Time Location System (RTLS) software and/or providing further location resolution. The tags can include motion detectors, call buttons, tamper evidence switches, temperature and humidity sensors and they can include a serial data port that can be used to query other devices and transport information from them as part of their telemetry message.

These applications are becoming very popular and one of the main reasons for that is the ability of Wi-Fi Access Points to receive and report messages from non-associating tags. However the support of non-associating tags is limited to infrastructure devices (e.g. Access Points or Location Receivers) and therefore the existing applications are all related and applicable to areas with fixed Wi-Fi coverage.

Therefore it is desirable to provide a method and system for monitoring of associating and non-associating Wi-Fi tags by a mobile device. The system and method are also applicable for extending the range of a Wi-Fi based real time location system (RTLS) and telemetry monitoring system so that it can operate with a high degree of location precision virtually anywhere in the world.

Using commonly available mobile devices such as "Smartphone" cell phones, a low cost method for monitoring, locating and/or relaying to a central server the tag information including its location of both associating and non-associating Wi-Fi RFID tags is described. To the extent that these Wi-Fi tags have telemetry capabilities such as temperature monitoring, call buttons, tamper evidence or serial data ports, then this telemetry information can be also passed to a centrally located event engine which can act on the telemetry and location data and provide location based services based on changes in the telemetry.

Alternatively, in a stand-alone system the tag telemetry can be locally processed by the Smartphone and initiate one or more actions, such as local alerting, Short Message Service (SMS) messages, voice calls, etc.

There are many possible applications for this invention and many potential expansions. Key applications include:

1. Remote monitoring of temperature, humidity or other condition monitoring data, for example on a truck or a (medical) laboratory courier car. In this case the temperature is constantly monitored and the location of the vehicle, refrigerator, cooler or thermos bottle may be constantly updated. It is important that both the condition monitoring data and the location of the host be known so that appropriate actions can be taken and alerts can be routed. The vehicle could have a cradle for the Smartphone so that it is constantly charged. The driver may carry the Smartphone with him when he leaves the vehicle during rounds, during which time the phone can still monitor the temperature of items/tags in range, e.g. of tags in a cooler he is carrying.
2. Remote monitoring can also use advanced features of the
    Smartphone. For example, the reception of data messages from specific tags or the reception of messages containing specific data can trigger a wide variety of events in the Smartphone including sending SMS or emails, send voice messages, record or play sounds, start web applications, activate the video camera, etc. The data sent by the Smartphone may include information relevant to the tag which triggered the event.
3. Tracking assets and/or people at a disaster site or battlefield. In this case emergency response personnel can associate tags with victims using the device, leave the tags with/attached to the assets or victims and constantly or periodically monitor their location, status or condition. The tags could all be in range 100% of the time or the person carrying the wireless host could walk or drive by and "sample" the tags' location and telemetry data across a large site.

4. Remote monitoring of facilities which may not be constantly occupied, such as vacation homes or storage facilities. In this case it may be important to know the humidity, temperature, level of water in the basement, presence of gas vapors, carbon monoxide, etc. even when the facility is not occupied. The Smartphone can be plugged into a local AC outlet and its internal battery would provide backup power in case of a power outage. Advanced features of the Smartphone, such as those listed in item 2 above may be applied to this scenario.

5. The system could be used for occasionally gathering telemetry data, such as reading utility meters. In particular a low frequency exciter could be used to cause the tag to beacon its telemetry data only when the data is required to be read, and then the data is received on the wireless host where it might be stored and forwarded, or sent in real time.

6. Remote monitoring of call buttons, such as for panic alerts or assistance requests. This might be useful in outdoor areas or large indoor or outdoor facilities such as stadiums where Wi-Fi coverage isn't normally available (and therefore the Wi-Fi tags wouldn't otherwise work). In effect the system can be used to create an ad hoc location based services system.

7. Fleet management of commercial vehicles, incorporating tags with OBD connectors to read the telemetry off of the vehicle, send it to a wireless host on the vehicle and then upload both the location of the vehicle and its current condition. By using bi-directional tags this data could be retrieved on demand.

8. In a more sophisticated environment, such as a battlefield, land mine clearing operation or disaster site multiple wireless host devices might be used and effectively create a "mesh" network that provides more precise tag location based on RSSI triangulation of the tags' messages combined with the geolocation of a Ground Positioning System (GPS) 35 location of each individual wireless host device. This information might be processed locally or sent over the network to a more powerful location engine for processing.

9. Bi-directional tags could be queried directly from the host wireless device.

10. In house arrest applications, prisoners can wear tags which may be constantly monitored. In case the prisoner is not in those areas he should stay, an immediate alarm and message can be sent to the police.
The Smartphones also can estimate the tag distance from the phone to provide an estimate regarding the risk of contact with the prisoner. By taking the host device with him the prisoner could have some degree of mobility, e.g. to permit him to go to work.

The present patent application describes a system and method for mobile monitoring and data relaying of tags which provide significant advantages over the existing art. Some of them were described above in this section.

SUMMARY OF THE INVENTION

The above objectives of using a method to provide monitoring of associating and non-associating tags by a mobile device are achieved in a method and in a system.

The basic elements of the system comprise an RFID tag able to broadcast Wi-Fi data messages in a non-associating mode and a Smartphone able to receive and decode the Wi-Fi messages broadcasted by the RFID tag in a non-associating mode.

Each of those elements may also be enhanced to include many other features thus providing a wide variety of system configurations and features.

According to one embodiment of this invention, the RFID tags operate in a non-associating (beaconing) mode such as those manufactured by AeroScout. These tags have significant benefits, including very low bandwidth utilization, long battery life and compatibility both with standard Wi-Fi access points and Time Difference of Arrival (TDOA) receivers. According to the present embodiment, they can also have the ability to receive messages from various types of Exciters including Low Frequency and Ultrasound, causing them to send immediate messages to RTLS software and/or providing further location resolution. The tags can include motion detectors, call buttons, tamper evidence switches, temperature and humidity sensors and they can include a serial data port that can be used to query other devices and transport information from them as part of their telemetry message.

Also in accordance with one embodiment of this invention, the Smartphone consists of a commonly available wireless device such as an Apple IPhone, Google Droid, Blackberry Storm 2, Garmin nüvifone or other similar devices that comprise Wi-Fi, cellular radio and an optional GPS receiver. This wireless device permits the creation of a short-range local area Wi-Fi network which the RFID tags can communicate with and whose location can optionally be accurately determined. These host devices can be located (geolocation) with a high degree of precision (down to a few meters) by using either the embedded GPS receiver or by triangulation through the cellular or other compatible radio communications towers within range of the device (e.g. E-911). Fundamentally, the Smartphone can "know" its location and if required also report it via the network.

A key feature of the present invention consists of modifying the capabilities of the wireless host device (Smartphone) to enable both non-associating and associating Wi-Fi RFID tags to communicate with the host device. In the case of non-associating tags the host device may simply recognize that the Wi-Fi data packet was received from an RFID tag. The tag packet includes tag identification and optionally telemetry data which can be processed by the Smartphone. In accordance with one embodiment, the tag telemetry is combined with the geolocation of the host device and forwarded across the cellular network to the appropriate Internet Protocol (IP) address of an RTLS software system.

Yet another feature of the tags according to the present invention is their ability to broadcast data messages without interfering with other clients in the same Wi-Fi network. This is achieved by a Clear Channel Assessment (CCA) mechanism in the tag which avoids transmission if the wireless channel is busy.

In the case of associating tags the host device can also serve as a Dynamic Host Configuration Protocol (DHCP) server for one or more tags and as a router for appropriately forwarding the tag's messages in both the uplink (to the RTLS software) and downlink (to the tag) directions.

Since the wireless host device is typically designed to conserve battery power the range of its Wi-Fi radio is or can be limited. According to a further aspect of the present invention, it is desirable that the tracked tag to be within a few (10 to 20 perhaps) meters of the device. In turn this means that the tag can be geolocated within the combination of this range and the location precision of the device itself.

For example, if the wireless host can be located within 3 meters using GPS 35 and its Wi-Fi range is 10 meters this means that the tag itself can be located within no more than 13 meters of the reported geolocation.

According to another aspect of the present invention, the phone's Wi-Fi radio might also be programmed to measure and forward the received signal strength indication (RSSI) at which it receives the tag's transmission and use this measurement (RSSI) for a "ranging" function, particularly if the device's environment and therefore propagation is consistent. This information can further improve the location calculation for the tag relative to the host device and relative to other tags tracked by the same host, so that a tag received with a low RSSI is farther from the device than a tag received with a higher RSSI value.

Therefore using commonly available mobile devices such as Smartphones it is possible to implement a low cost system for monitoring RFID tags. The tags will periodically transmit data messages which will be received and decoded by the Smartphone. This telemetry information can be locally stored in the Smartphone, and/or used by the Smartphone to trigger special actions (automatically or as instructed by the user) according to the contents of the received tag messages.

Software or other programming on the Smartphone is required to cause it to recognize different type of tags, optionally and automatically determine its own location using the most accurate method available (e.g. GPS 35 outdoors, E-911 triangulation indoors), incorporate this location information with the tag data and send that over the network to the RTLS software, or process it locally. It may be desirable that the Smartphone device be capable of using an encrypted communications protocol over a Virtual Private Network (VPN) to communicate this information to the RTLS software.

The Smartphone itself could be hand carried by a person, mounted in a cradle in a vehicle or on another host platform (for longer battery life). It is assumed that the device is highly portable/mobile and therefore it can perform these tasks anywhere it may be required, in real time. It should be able to adapt automatically as conditions vary, for example by switching from GPS 35 to E-911 location as it moves into areas where GPS 35 coverage is not available, or by switching/roaming cellular networks as coverage varies. It can also report its calculated location accuracy, to be used by the RTLS software, providing a range accuracy estimate for the tags.

A different form of the present invention involves a Smartphone containing a Wi-Fi radio, a GPS receiver and under the coverage of a cellular or other wide area communication network, which can be used to create a system that can receive Wi-Fi telemetry messages from RFID tags, calculate the location of the host device and the associated/neighboring tags and then communicate this information over the wireless communications network. The information can be processed by RTLS software at a central monitoring station(s) or at other mobile devices (e.g. Smartphones, laptops, etc.). Based on the received information the status and location of the Wi-Fi tags can be recorded, monitored, acted and reported upon. Certain information may also be processed locally, on the Smartphone, for immediate action in special cases when the cellular network is temporarily not available and/or when immediate local alerting is desired.

Other monitoring applications and according to another exemplary embodiment of this invention, include communicating the location of the tag to another wireless unit (e.g. another Smartphone) and/or to a central server. The Smartphone may perform this data communication through one or more of the communication channels it has available (e.g. cellular network, Wi-Fi network, Bluetooth, etc.).

This architecture basically extends the range of a Wi-Fi based real time location system (RTLS) and telemetry monitoring system so that it can operate with a high degree of location precision virtually anywhere in the world.

Depending on the processing power of the wireless host device some data processing can take place on the device itself. For example, temperature or other telemetry data could be evaluated against predetermined criteria and the device can create a local alert if the preset parameters are not met. The phone might call and send pre-recorded voice messages or synthesized voice messages, send an email, Short Message Service (SMS) or any combination thereof as a result of tag telemetry that is processed locally.

Assuming the Smartphone can also receive or send email, SMS or other messages, they can be used to alert a person local to the device that some action needs to be taken when a rule is violated and an alert is fired from the RTLS software system. For example a truck driver could be notified that the temperature of an RTLS tag in his truck is out of range, requesting he take immediate action to avoid spoilage of the items in his truck. Those messages can be transmitted via the cellular network or other type of wireless networks as Wi-Fi, Bluetooth, infrared, etc.

In other cases and also according to another embodiment of this invention, those actions may include the activation of the embedded still or video camera and then storing and/or sending the video data to another unit, or performing a sound recording.

The Smartphone can also be used to associate and de-associate tags with other assets or people, either locally or via a web browser connection to the RTLS software system.

In other cases and according to an embodiment of this invention, where the Smartphone doesn't have its own internal GPS receiver or it's not possible to calculate its location by other means, it is possible to use a GPS tag (e.g. AeroScout GPS tag) which has its own GPS receiver and a Wi-Fi transmitter to provide location data for the Smartphone and all its received tags, whether they have GPS capabilities or not.

Other sophisticated applications and still within the scope of this invention include a network comprising several Smartphones all being able to receive and decode packets from non-associating tags and all of them being in communication range with one or more Wi-Fi tags.

Since the location of each of the Smartphones can be easily determined, the phones can create a simple location network in which a tag is precisely located using triangulation. The phones can communicate between themselves directly or over the cellular network. In another exemplary embodiment they will transfer the tag and phone information to a central site equipped with RTLS software to calculate the tag location.

The RTLS software, according to another embodiment of the present invention, is composed of standard off-the-shelf RTLS software applications such as AeroScout Location Engine and/or MobileView, modified as/if necessary to process the additional types of information resulting from this invention. In general those software applications include a display layer, a location engine, a rules/event engine, an associated database, a reporting tool, an alerting mechanism(s) and an interface layer for bidirectional communication with third party applications. The location engine must be capable of receiving geolocated tag data from the wireless host and appropriately interpreting it. This will likely require an Internet Gateway that receives and transmits TCP/IP information from the cellular network and attached Internetwork via this gateway. The software must either be able to process and display information on a dynamic global map of a Geographic Information System (GIS) or interface with a third party application such as Google Earth/Maps which can display the location of the wireless host and associated tags anywhere in the world.

The foregoing and other objectives, features, and advantages of the invention will be apparent from the following and more particular, descriptions of the exemplary embodiments of the invention, as illustrated in the accompanying drawings.

BRIEF DESCRIPTION OF THE DRAWINGS

FIG. 3 is a pictorial diagram describing an extended implementation of the RFID tag monitoring system according to another embodiment of this invention. The system includes two tags (one with pushbutton) and a Smartphone which is also connected to a cellular network. The Smartphone has an embedded GPS receiver and can also receive Wi-Fi data packets from non-associating tags, measure the Received Signal Strength Indication (RSSI) level of the received packets and estimate the distance to each of the monitored tags. The Smartphone can send the tag information, its own location and any other information to other units (e.g. Internet clients, cellular phones, wired phones, etc.) taking advantage of its connection to the cellular network.

DETAILED DESCRIPTION OF THE PREFERRED EMBODIMENTS

Therefore, it is the purpose of this patent to provide a System and Method for mobile monitoring and data relaying of tags which can be used in many configurations and embodiments in accordance with the required application. The detailed description of preferred embodiments of this invention is presented in this section.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Some embodiments of the invention are herein described, by way of example only, with reference to the associated drawings. With specific reference now to the drawings in detail, it is stressed that the details shown are by way of example and for purposes of illustrative discussion of embodiments of the invention. In this regard, the description taken with the drawings makes apparent to those skilled in the art how embodiments of the invention may be practiced.

In respect to the present invention, the term "Wi-Fi tag", "WLAN tag" or "tag" means a portable RFID wireless device, including WLAN unidirectional (i.e. can only transmit messages) or bidirectional (i.e. can both receive and transmit messages) communication means based on frame formats in accordance with a IEEE802.11x (e.g. 802.11a/b/g/n) standard, stand alone or integrated into other devices, powered by an internal battery or externally powered, semi-passive or active.

The term "Wi-Fi data" means any wireless message using frame format in accordance with IEEE802.11x (e.g. 802.11a/b/g/n) standard.

The tag may optionally include other communication means in addition to the one used to communicate with the WLAN (e.g. ultrasound, Ultrawideband, infrared, low frequency magnetic interface, wired serial interface, etc.) as well as optional sensors (e.g. temperature, humidity, motion, etc.).

The term "Smartphone" means a mobile cellular phone offering advanced capabilities, often with PC-like functionality (PC-mobile handset convergence) and other advanced features. In respect to this patent, the Smartphone also includes Wi-Fi support making it able to communicate in standard Wi-Fi networks. Other functionality might include an additional interface such as a miniature QWERTY keyboard, a touch screen or a D-pad, a built-in camera, contact management, an accelerometer, built-in navigation hardware and software, the ability to read business documents, media software for playing music, browsing photos and viewing video clips, Internet browsers, barcode scanner, passive RFID reader etc.

The term "tag sensors" data means any information that an RFID unit transmits from a sensor it is connected to and that the unit transmits in addition to its identifier. Examples of tag sensor data can be temperature, pressure, humidity, battery indicator and motion indication.

The term "non-associating tag" or "non-associated tag" means a tag which has no means to associate with a WLAN device (e.g. a unidirectional tag), or was programmed to not associate with a WLAN device or it is operating in a mode in which there is no association between the tag and another WLAN device. The term "non-associating mode" or "non-associated mode" refers to an operation mode in which data messages are received by the tag and/or transmitted by the tag in a WLAN without any prior association of the tag to another WLAN device.

The term "associating tag" means a tag which has means to associate with a WLAN device and is operating in a mode in which there is association between the tag and another WLAN device. Association refers to the service used to establish access point-station AP/STA mapping and it requires two way communication between both units. In standard Wi-Fi networks, normal data transfer between an Access Point and a wireless station is enabled only after there is an association between the station and the AP.

Figure 1A:
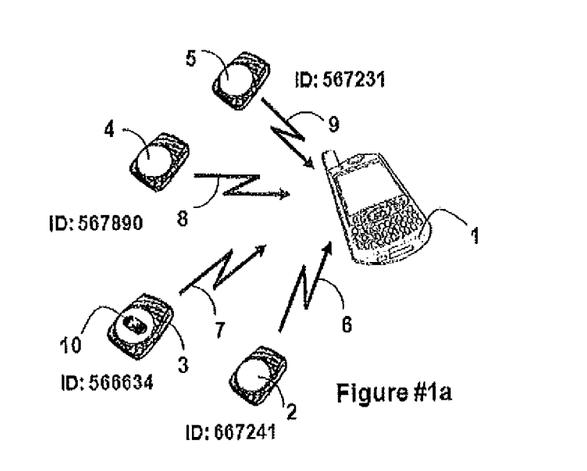
FIG. 1a depicts a basic RFID tag monitoring system including four tags and a Smartphone according to an embodiment of this invention. The Smartphone can receive Wi-Fi data packets from non-associating tags.

Referring now to the figures and in particular to FIG. 1a, a basic system according to an one embodiment of this invention is depicted. A Smartphone 1 which may have the capability of receiving and decoding Wi-Fi data packets from non-associating tags is in the vicinity of four RFID tags 2-5 which may broadcast Wi-Fi data messages 6-9 respectively. The tags may be battery powered and each of them may have a unique identification as shown in FIG. 1a. While four RFID tags 2-5 may be shown, this should not be seen in a limiting manner.

The Smartphone Wi-Fi radio may be in an active mode and may be configured to a default channel (e.g. channel #1). The tags 2-5 may broadcast their messages 6-9 without making any association with any other network device, in one or more Wi-Fi channels (e.g. channels 1, 6 and 11), one of them being the default channel to which the Smartphone 1 radio may be configured. Since the tags 2-5 may be in communication range with the Smartphone 1, the broadcast messages 6-9 may be received by the Smartphone 1 radio and then decoded by the Smartphone 1 processor.

Tags 2-5 may be unidirectional or bidirectional. Unidirectional tags may include a simple radio mainly comprising a transmitter to transmit messages and a simple receiver to perform CCA operations. Both types may broadcast Wi-Fi data messages which can be received by one or more receivers located in communication range with those tags 2-5. According to one embodiment, the transmission of messages by the tags 2-5 may be periodic and at programmed intervals or as a result of an event. For example tag 3 may have a pushbutton 10. Pressing this pushbutton 10 may initiate a transmission of a Wi-Fi packet in a non-associating mode.

As previously explained, the tags 2-5 may broadcast the messages 6-9 only when the channel is free. This may be accomplished by a clear channel assessment (CCA) mechanism in the tags 2-5. If the channel is busy, the tags 2-5 will wait and make an additional transmission attempt after a random time.

The format of the messages 6-9 transmitted by the tags 2-5 may differ and also be adapted to the receiver type. According to one embodiment, the format of the packets is IBSS according to the IEEE802.11 standard. Another format suitable to some commercial Wi-Fi radios is WDS (wireless distribution system), also in accordance with IEEE802.11 standard.

In addition, and according to another embodiment, the payload of the transmitted data messages may be defined by the Cisco CCX specifications, while in other cases it may be according to the AeroScout tag message format specifications.

Moreover, the tag message payload may also be encrypted in accordance with the different encryption mechanisms available for IEEE802.11 clients. Tags transmitting with the non-matching encryption key will be filtered out by the receiving device.

Since Smartphone 1 is in the vicinity of tags 2-5, it can receive messages 6-9 transmitted by the tags 2-5 and then continuously receive those messages 6-9 and detect any new tag which is in communication range. Once a message 6-9 is correctly received and decoded, the ID, the status of the tag 2-5 and any other transmitted information may be read. According to one embodiment, the status of the tags 2-5 may be transmitted on each packet and may include battery status, hardware and software version, motion sensor status, etc.

The received information can be displayed by the Smartphone 1 on its display and/or stored in its internal memory. Smartphone 1 can make use of pop-windows as a result of special events triggered by tag messages.

According to another embodiment, the Smartphone 1 can make association between the tag ID and other information stored in the phone (e.g. picture of a person carrying the tag). In that case, the pop-up window can also include the picture of the person and any other relevant information.

In addition, tags 2-5 can also be filtered out based on the tag ID, message payload, estimated range, etc. The filter rules can be very flexible and similar in concept to the rules used to filter out emails. Since more than one phone can simultaneously receive the same tag messages, some of them can accept them while others can reject them and filter them out.

The monitoring capabilities of the Smartphone 1 can also be used for many other applications. For example, the time of reception (e.g. time stamp with resolution of a few msec) of the tag messages 6-9 can be measured and used to know the response time of different people to a specific event (e.g. training, contents, voting, biofeedback, etc.).

Figure 1B:
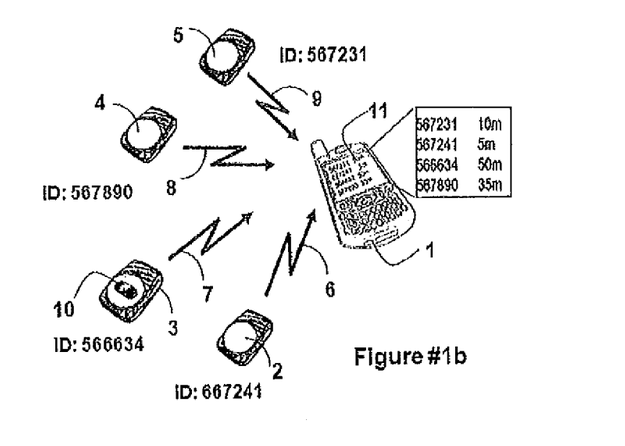
FIG. 1b depicts a basic RFID tag monitoring system as depicted in FIG. 1a, including four tags and a Smartphone according to another embodiment of this invention. The Smartphone can receive Wi-Fi data packets from non-associating tags, measure the RSSI level of the received packets and estimate the distance to each of the monitored tags.

Referring now to FIG. 1b, a further improvement of this invention is presented. Smartphone 1 may be able to receive and decode Wi-Fi messages from non-associated tags 2-5 and in addition it is able to measure the signal level (RSSI) at which those messages 6-9 are received. The measurement of the RSSI of a received packet is a standard feature in all Wi-Fi receivers, normally used as part of the automatic gain control (AGC) mechanism.

It is well known that the RSSI information can be used to estimate the distance between the transmitter and the receiver. Although many other factors have influence on the measured RSSI, the distance is a key parameter.

Given that the transmission power of the tags 2-5 is known (e.g. +17 dBm) as well as other basic parameters (e.g. antennas gain, center frequency, etc.), the distance between the tag 2-5 and Smartphone 1 units can be easily estimated using well known wireless propagation models.

Therefore, and according to an embodiment of the present invention, Smartphone 1 can measure the RSSI of the received messages 6-9 and estimate the distance of the respective tags 2-5 and in some cases their location.

In accordance with one embodiment of this invention, the tag messages 6-9 include the channel number (this information is not mandatory in standard IEEE802.11 data packets). The channel number is particularly useful when measuring the RSSI of the received packet. Since a Wi-Fi radio can receive messages transmitted in adjacent channels, both the transmitter and the receiver need to operate on the same channel in order to ensure a true RSSI measurement.

Having the capability to estimate the tag distance may be useful in many applications. Thus, according to one form of this invention, the Smartphone 1 can list the received tags 2-5 according to their estimated distance or any other key 11. Tags 2-5 which are closer or farther than a programmed distance can trigger an alarm in the Smartphone 1 or initiate an action (e.g. vibrating or sound alert). In some cases, the shortest or longest permitted distance can be directly transmitted by the tag itself thus creating a very flexible monitoring system.

For monitoring purposes, the Smartphone 1 can also count or compare the number of received tags 2-5 to given list of tags and alert if certain amount of tags is missing or is present.

In another embodiment, the estimated distance can also be used to search for a specific tag.

The estimated distance can also be used to display the area in which the tag 2-5 is probably located. This is particularly useful when the location of the phone is also known. In one particular embodiment, the Smartphone 1 is connected to a large display monitor (e.g. using a VGA connector or wirelessly) on which a map with the location of the monitored tags can be displayed.

Figure 2A:
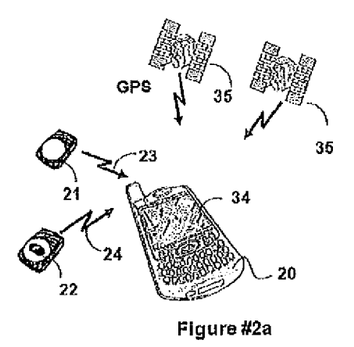
FIG. 2a depicts another implementation of a basic RFID tag monitoring system, including two tags (one with pushbutton) and a Smartphone according to another embodiment of this invention. The Smartphone has an embedded GPS receiver and can also receive Wi-Fi data packets from non-associating tags, measure the RSSI level of the received packets and estimate the distance to each of the monitored tags. The Smartphone uses the GPS 35 to estimate the tag's location.

FIGS. 2a-2d describe specific implementations in accordance with embodiments of the present invention. Referring now to FIG. 2a, a small system comprising a Smartphone 20 with an embedded GPS receiver and two tags 21 and 22 is depicted. While two tags 21 and 22 are shown, this should not be seen in a limiting manner.

The tags 21-22 broadcast messages 23-24 in a non-associating mode which are received and decoded by the Smartphone 20. Since the Smartphone 20 can precisely locate itself with the GPS receiver (given GPS coverage 35 is available), then the approximate location of the monitored tags 21-22 can also be estimated.

In accordance with one embodiment, this small system can operate in a stand-alone manner, while in other embodiments the Smartphone 20 can transfer the tag information and estimated location to other units across the cellular network. For example, if the pushbutton is pressed on the tag 22, a message 24 comprising the tag ID and the pushbutton information will be transmitted. The Smartphone 20 will locate itself and estimate the range to the tag 22 and all this information will be forwarded by the Smartphone 20 to a third monitoring party. It can also display the estimated tag 22 location on its display 34. The cellular channel can also be used to command the Smartphone 20 in respect to the monitoring operations.

Another embodiment which is not shown in this figure comprises a tag 21 and or 22 with an embedded GPS receiver and which transmits the location information in its broadcasted message. In this case, the Smartphone 20 can accurately calculate the distance to the tag.

Figure 2B:
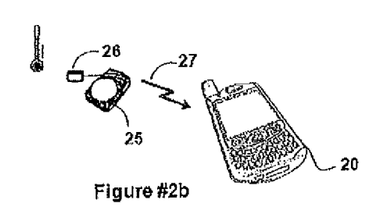
FIG. 2b depicts another implementation of a basic RFID tag monitoring system, including one tag with a temperature sensor and a Smartphone according to another embodiment of this invention. The Smartphone can also receive Wi-Fi data packets from non-associating tags, and read the telemetry (e.g. temperature) sent by the tag.

FIG. 2b describes a different application still in accordance with an embodiment of the present invention. Tag 25 has a temperature sensor 26 which can measure the ambient temperature in a given range. This tag 25 can periodically send messages 27 comprising also the measured temperature and which are received and decoded by the Smartphone 20. Upon reception of the tag messages 27, the Smartphone 20 can store them together with a time stamp and any other relevant information. The measured temperature can trigger different actions in the Smartphone 20. The Smartphone 20 can also store in its large memory a bulk of temperature measurements and send them upon request to another application. The Smartphone 20 can also process the received temperature values and provide different alerts.

For example, "cold chain" applications can strongly benefit from this invention since the availability of Smartphones 20 close to the sensor tags 25 can provide a simple solution to store the temperature values measured and transmitted by the tag 25. A cold chain is a temperature-controlled supply chain. An unbroken cold chain is an uninterrupted series of storage and distribution activities which maintain a given temperature range. It is used to help extend and ensure the shelf life of products such as fresh agricultural produce, processed foods, photographic film, chemicals and pharmaceutical drugs.

Other applications may comprise monitoring the temperature in home, commercial or industrial environments. The type of sensor can vary between tags and may comprise sensors for humidity, water level, pressure, darkness, motion, electrical power (AC or DC) etc.

As may be easily understood, a larger system may comprise many tags including different sensors and monitored by one or more Smartphones.

Figure 2C:
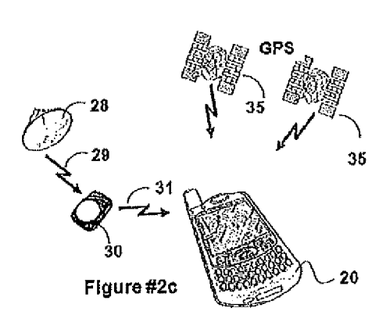
FIG. 2c depicts an enhanced implementation of a basic REID tag monitoring system, including a tag, an LF (low frequency) transmitter (LF exciter) and a Smartphone according to another embodiment of this invention. The LF transmitter broadcasts low-frequency (e.g. 125 or 134 KHz) data messages which are received and decoded by the tags. The tags respond by transmitting Wi-Fi messages including the LF transmitter identification (ID). The LF transmitter's location may be precisely known, for example if it is mounted in a known, fixed location and this information can be used to further refine the location of the tag. The Smartphone may have an embedded GPS receiver and it is able to receive Wi-Fi data packets from non-associating tags.

Referring now to FIG. 2c, another embodiment of a basic RFID tag monitoring system, including a tag 30, an LF (low frequency) transmitter (LF exciter) 28 and a Smartphone 20 is described. The LF transmitter 28 broadcasts low-frequency (e.g. 125 KHz) data messages 29 which are received and decoded by the tag 30. The Low Frequency (LF) link is preferably of the type of near-field magnetic link but other commercial RFID links can be used as well (e.g. operating in one or more of the following bands: 125 KHz, 13.56 MHz, 868 MHz, 900 MHz and 2.4 GHz). Also ultrasound and/or infrared links may be used for the same purpose. The broadcast LF messages 29 include the transmitter ID, system information and other data fields used to program or control the tag 30. According to this embodiment, the tag 30 responds by transmitting Wi-Fi messages 31 including the LF transmitter 28 ID. The Smartphone 20, which may also have an embedded GPS receiver, is able to receive the Wi-Fi data packets 31 from the non-associating tag 30. In those cases where the placement of the LF transmitter 28 is known (e.g. fixed deployments), then LF transmitter 28 ID can be used to position the tag 30 on the map displayed in the Smartphone 20 or other RTLS location application. Alternatively, if both the tag 30 and the LF transmitter 28 are moving, then the Smartphone 20 GPS can be used to estimate the location of the tag 30. Using an LF transmitter 28 to trigger the tag 30 is particularly useful, since the tag 30 can be in sleep mode most of the time and wake-up when triggered by the LF transmitter 28.

Figure 2D:
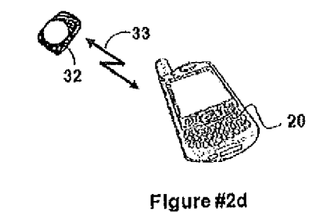
FIG. 2d depicts another implementation of a basic RFID tag monitoring system including one bi-directional tag and a Smartphone according to another embodiment of this invention. The Smartphone can maintain direct two-way data communication with the tag using Wi-Fi (ad hoc or Independent Basic Service Set—IBSS network) or through an infrastructure-based (Basic Service Set—BSS or Extended Service Set—ESS) network. It can also receive data packets when the tag is not associated.

Referring now to FIG. 2d, another implementation of a basic RFID tag monitoring system is described including one bi-directional tag 32 and a Smartphone according to another embodiment of this invention. The Smartphone 20 can maintain direct two-way data communication 33 with the tag 32 using Wi-Fi (ad hoc or IBSS network) or through an infrastructure-based (BSS or EBSS) network. It can also receive Wi-Fi data packets 33 when the tag 32 is not associated with any Access Point.

Also according to this embodiment the Smartphone 20 is used to program the tag 32 using the 2-way communication 33. This may include programming tag 32 parameters (e.g. blink rate, operating channels, transmission power, pushbutton behavior, encryption keys, etc.) or controlling the tag 32 (e.g. tag activation/deactivation, receiver activation/deactivation, buzzer/vibrator activation, etc.). In some cases, it will be desirable to save the tag 32 battery life by allowing the tag 32 to open its Wi-Fi receiver only at short intervals and at predefined times. For example, the tag 32 can open a receive window of 1-2 seconds after each periodic transmission. The Smartphone 20 receiving the periodic transmission 33 from the tag 32, can then answer to the tag 32 within this short receive window and activate the tag 32 receiver for a longer time.

Other embodiments including a tag 32 and a phone 20 with an infrared transceiver can make use of this link to transfer bidirectional messages between the units. Also a wired interface between the phone 20 and the tag 32 for programming is a suitable alternative.

In another embodiment, the two-way Wi-Fi communication 33 between the tag 32 and the Smartphone 20 can provide to the tag 32 sophisticated network functions. For example, the phone 20 can allow Wi-Fi tags 32 to connect to it, provide to them DHCP addresses and route them to the Internet via the phone's cellular radio to a remote server.

In addition, Smartphones 20 with an IEEE802.15.4a or IEEE802.15.4 radio can interface with a tag 32 further comprising a compatible radio and perform similar functions as described for the Wi-Fi channel.

When using radio channels like the UWB IEEE802.15.4a more sophisticated functions can also be performed. In accordance with one embodiment, a Smartphone 20 communicating with a tag 32 further comprising both an IEEE802.15.4a radio and accurate time-of-arrival (TOA) measurement capability, can also accurately measure the range to the tag 32. When this is combined with the self location capabilities of the phone 20 using GPS 35 or other methods, an accurate estimate of the tag 32 position can be derived. This capability also enables a reliable searching or distance monitoring of tags 32 linked to that Smartphone 20. This additional functionality can be fully integrated into the Smartphone 20 or implemented in a pluggable module which can be optionally connected (via the USB or SD card port) to the Smartphone 20 to perform those functions.

Smartphones 20 equipped with a still photo or video camera (not shown in FIG. 2d) can use it to read the tag 32 barcode and then provide a very powerful method of verifying the tag ID received through the Wi-Fi channel 33. In another embodiment, the Smartphone 20 may include a different type of barcode scanner (e.g. laser type) or even a passive RFID reader. These embedded scanners and/or readers in the Smartphone 20 can be used to read information from the tag 32, from other objects or from passive RFID tags related to the tag 32 and for example associate that tag 32 to other objects, persons, pictures, etc.

Figure 3:
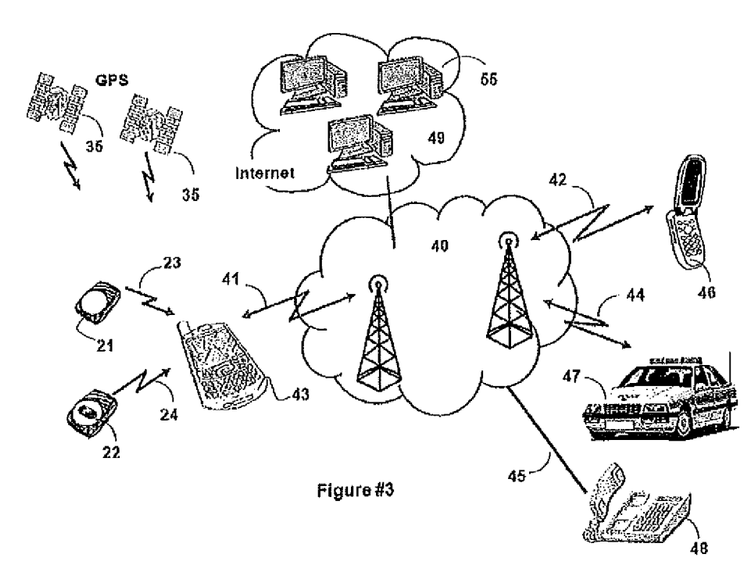

Now referring to FIG. 3, a pictorial diagram describing an extended implementation of the RFID tag monitoring system according to another embodiment of this invention is shown. The system includes two tags 21-22 (one with pushbutton 22) and a Smartphone 43 which is also connected to a cellular network 40. The Smartphone 43 has an embedded GPS receiver and can also receive Wi-Fi data packets 23-24 from non-associating tags 21-22, measure the RSSI level of the received packets 23-24 and estimate the distance to each of the monitored tags. The Smartphone 43 can send the tags' 21-22 information, its own location and any other information to other units (e.g. Internet clients 55, cellular phones 46-47, wired phones 48, etc.) taking advantage of its connection to the cellular network 40.

The system as described in FIG. 3 can provide several benefits according to different embodiments of this invention.

In accordance with one embodiment, the Smartphone will send an SMS 41 (e.g. alert) as a result of tag 22 telemetry (e.g. pushbutton activation). That way, the Smartphone 43 can just serve as a relay unit and basically provide to the tags 21-22 the capability of sending "virtual" SMS messages. Many other Smartphone 43 actions can be implemented as part of other exemplary embodiments.

As a result of specific tag telemetry 23-24, the phone 43 can call and send pre-recorded voice messages, synthesized voice messages or a combination of both. Emergency messages 23-24 from the tags 21-22 may include a phone 46 number, to which the Smartphone 43 needs to send an SMS 41-42 or make a phone call, thus simplifying the process since there is no need to program this number in the Smartphone 43.

In more sophisticated embodiments of this invention, a trigger from the tag 21-22 is used to post a message into a Web application 49 (by the phone), for example in application like Facebook, Twitter, etc. In special cases the Smartphone 43 can use a VPN (Virtual Private Network) to send secured messages. Tag 21-22 messages 23-24 can start different applications in the Smartphone 43. For example:

Take and send a picture
Start the recording of a video clip and send it
Start a GPS or Aided GPS (A-GPS) location
Record a sound
Play a sound or file
Initiate a Bluetooth or infrared connection with another device
Start a Web application
A trigger can be created by the tag 21-22 as a result of (partial list):
Normal blink
Sensor alert
Reception of an LF message or Ultrasound (US) message or Infrared (IR).
Pushbutton
In other embodiments, tag messages 23-24 which are received by the Smartphone 43, are stored in formatted documents which can later be exported or sent as attachments. For example:

Microsoft Word documents, including tag 21-22 identification, status and other telemetry information Microsoft Excel documents, including tag 21-22 identification, sensor data, etc.

Voice message including tag 21-22 identification and location

Figure 4:
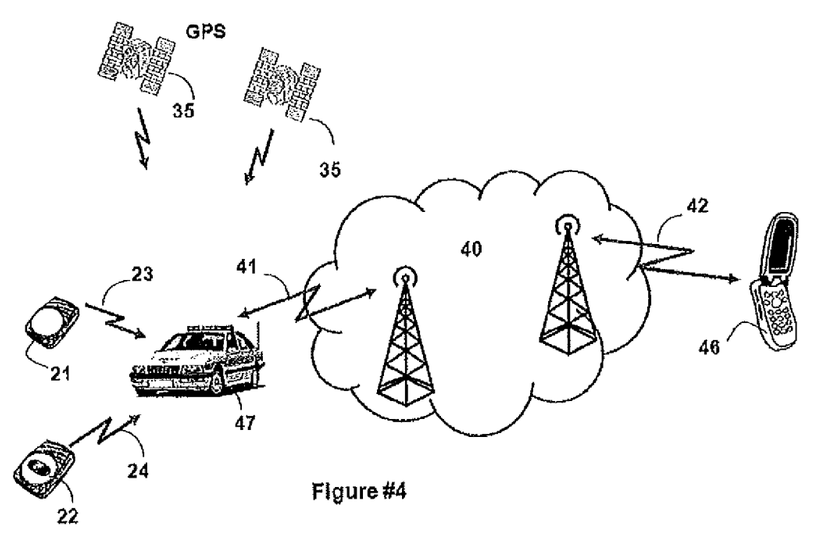
FIG. 4 is a pictorial diagram describing a different implementation of the system in FIG. 3 according to an embodiment of this invention. In this exemplary embodiment, the Smartphone is embedded in the car and optionally connected to a GPS receiver. The Smartphone in the car can also receive data messages from non-associating tags embedded in the car (e.g. used to send specific vehicle information through an OBDC connector).

Referring now to FIG. 4, a pictorial diagram describing a different implementation of the system in FIG. 3 according to an embodiment of this invention is shown. In this embodiment, the Smartphone 43 (not shown) is embedded in the car 47 and optionally connected to a GPS receiver. The Smartphone in the car 47 can also receive data messages from non-associating tags 21-22 including tags embedded in the car, for example tags used to send specific vehicle information and connected to the OBD-II (On board diagnostic) connector.

Additional embodiments can provide tracking the location of cars 47 as well as sensors (e.g. temperature of the items in the car) embedded in Wi-Fi tags installed in the car 47. Fleet management of commercial vehicles, incorporating tags with OBD-II connectors to read the telemetry off of the vehicle, send it to a wireless host on the vehicle and then upload to the cellular network 40 both the location of the vehicle and its current condition. By using bi-directional tags this data could be retrieved on demand.

Assuming the Smartphone 43 can also receive or send e-mail, SMS or other messages it can be used to alert other persons 46 that some action needs to be taken when a rule is violated and an alert is created (locally or from an RTLS software system). For example a truck driver could be notified that the temperature of an RFID tag in his truck is out of range, requesting he take immediate action to avoid spoilage of the items in his truck.

Figure 5:
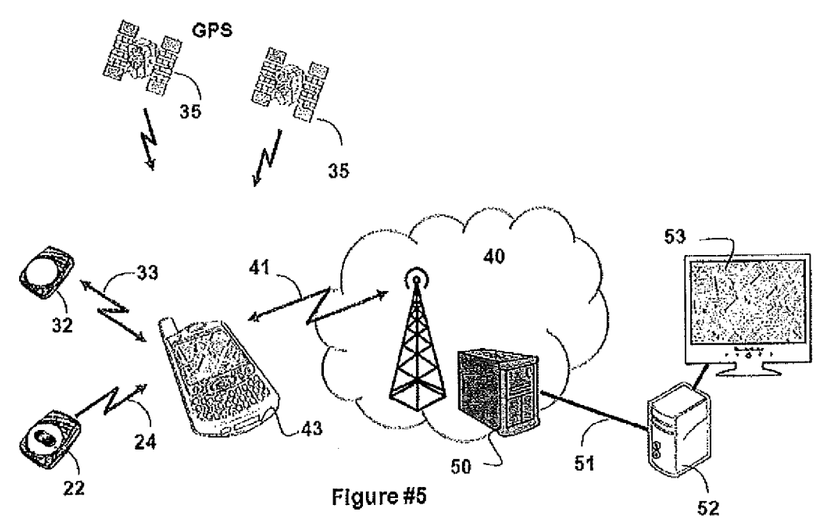
FIG. 5 is a pictorial diagram describing a different implementation of the monitoring system according to an embodiment of this invention. The Smartphone relays the tag information, phone position (optional) and any other required information to a real-time location system (RTLS).

Referring now to FIG. 5, a pictorial diagram describing a different implementation of the monitoring system according to another embodiment of this invention is depicted. The Smartphone 43 relays the tags 22-32 information, phone 43 position (optional) and any other required information to a real-time location system (RTLS) 52-53.

In another embodiment according to FIG. 5, the Smartphone behaves as a mobile Wi-Fi router that uses cellular radio network 40 as a backhaul. The Smartphone 43 sends a packet containing tag 22 and 32 information through the cellular network 40 to an RTLS (Real Time Location System) S/W 52-53 (e.g. AeroScout Location Engine and MobileView) via an "Internet Gateway".

The Smartphone 43 can send both the tag telemetry 24, 33 and its GPS 35 location to an RTLS application 52-53 through this new "Internet Gateway" 50 and/or use a connection to Google Maps 53, or Bing or similar, to locate the tag 22, 32 based on the Smartphone 43 GPS coordinates.

For non-associating tags 22 the phone device must simply recognize that the communications packet 24 received from the RFID tag 22 is a location and/or telemetry message and forward it across the cellular network 40 to the appropriate (IP) address of the RTLS software system 52, tagged with the geolocation of the host device 43. In the case of associating tags 32 the Smartphone 43 also can serve as a DHCP server for one or more tags and as a router for appropriately directing the tag's messages 33 in both the uplink (to RTLS software 52) and downlink (to tag 32) direction.

As can be easily understood, this geolocated message can be forwarded over the best (fastest, lowest latency, lowest error and/or lowest cost) available communications network to the RTLS software. The RTLS is just one possible application. Many other applications can be developed using the same principles.

Figure 6:
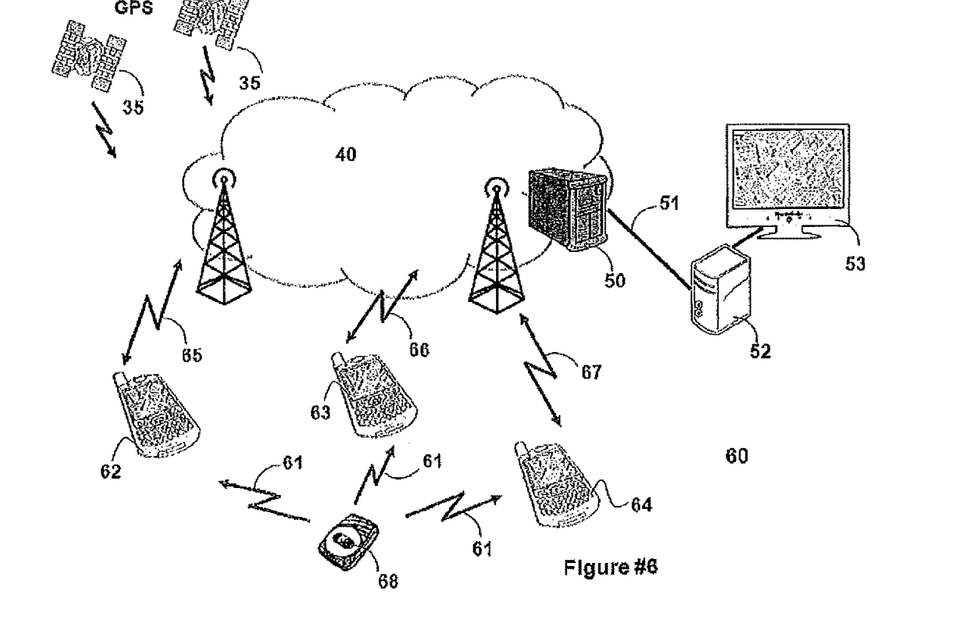
FIG. 6 is a pictorial diagram describing an enhanced implementation of the monitoring system described in FIG. 5 according to an embodiment of this invention. Several Smartphones in the proximity of a monitored tag receive and relay the tag information together with additional information like phone position, RSSI level of the tag message to a real-time location system (RTLS). The information is used to locate the tag.

Referring now to FIG. 6, a pictorial diagram describing an enhanced implementation 60 of the monitoring system described in FIG. 5 according to an embodiment of this invention is shown. Several Smartphones 62-64 in the proximity of a monitored tag 68 receive and relay the tag 68 information together with additional information like phone position, RSSI level of the tag message to a real-time location system (RTLS) 52-53. The information is used to locate the tag 68 by triangulation.

Also according to this embodiment, the Smartphones 62-64 (with GPS receiver) can perform a joint location of a tag 68 (e.g. using RSSI triangulation) and by transferring information between themselves through the cellular, Wi-Fi or other network 40. One or more of the phones 62-64 can be used to display the map and the tag 68 location.

When some or all the Smartphones 62-64 used to locate the tag 68 have no GPS receiver to locate themselves, the location of those phones 62-64 can be performed by the cellular system 40. This location is expected to be less precise than when using a GPS 35, but it provides a high degree of flexibility and cost effectiveness.

Other embodiments may include more accurate location methods like using two-way ranging based on TOA (time of arrival) measurement, triangulation using AOA (Angle of Arrival and using an additional unit/ front-end in the Smartphone) or the combination of several location methods.

In other embodiments, the communication between the Smartphones can be direct and without involving the cellular network 40.

Figure 7:
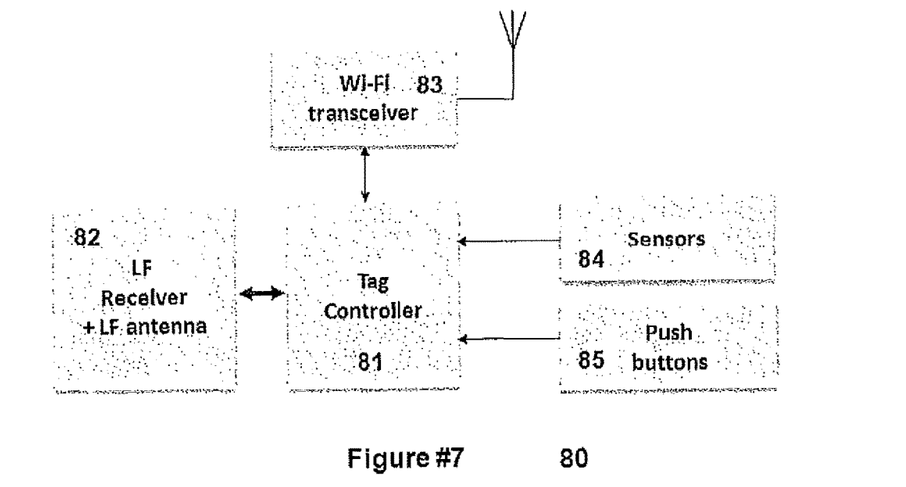
FIG. 7 is depicts a block diagram of an RFID tag according to an embodiment of this invention Common reference numerals are used throughout the drawings and detailed description to indicate like elements.

Referring now to FIG. 7, a simplified block diagram of an REID tag 80 according to an embodiment of this invention is described.

The tag 80 may include a tag controller 81 which controls the whole tag 80 operation. Wi-Fi messages are broadcasted through the Wi-Fi transceiver 83 which typically includes a receiver and transmitter operating in the appropriate band and according to one of the IEEE802.11 standards. This function also includes a MAC and baseband controller used to assemble and decode messages. Tags with no Wi-Fi receiver (unidirectional tags) will include just part of the mentioned functions (i.e. transmitter functions and CCA functions). Wi-Fi messages are transmitted or received through an embedded antenna.

In addition to the Wi-Fi transceiver 83, the tag 80 may also include a low frequency (e.g. 125 KHz) (LF) receiver and LF antenna 82 used to receive messages from LF transmitters and based on a near field communication. One main characteristic of this LF link over other types of communication technologies is the very low power consumption of the LF receiver 82 (around 1 uA). This makes it possible for the tag 80 to activate this receiver 82 continuously without significantly impacting the tag battery (not shown) life.

The tag 80 may also be connected to sensors 84 (e.g. motion, temperature, humidity, pressure, ultrasound, IR, etc.) and to pushbuttons 85. Those input devices 84-85 provide to the tag 80 a very rich functionality as already described in the above described embodiments of this invention.

Other tag embodiments may also include a GPS receiver, additional radios (e.g. UWB 802.15.4.a), indicators (e.g.

Light Emitting Diodes-LEDs, Liquid Crystal Display-LCD, etc.) and many other peripherals as commonly found in off-the-shelf RFID tags (e.g. AeroScout tags).

As can be easily understood by those skilled in the art, Wi-Fi mobile units of many types (e.g. laptops, handheld devices, etc.) can simulate and/or receive and process the non-associated transmissions of the RFID tags and make use of many of the advantages described.

While the invention has been particularly shown and described with reference to the exemplary embodiments thereof, it will be understood by those skilled in the art that many alternatives, modifications and variations and other changes in form, and details may be made therein without departing from the spirit and scope of the invention.

What is claimed is:

1. A tangible, non-transitory computer-readable storage medium storing instructions that, when executed by at least one processor, cause the at least one processor to perform operations for determining a location of a tag using a mobile cellular device, comprising:
    receiving, on the mobile cellular device, non-cellular data messages transmitted from the tag, the tag being not previously associated with the mobile cellular device;
    decoding the non-cellular data messages to obtain information relating to the tag;
    determining a location of the mobile cellular device;
    measuring a signal strength of the received non-cellular data messages;
    outputting to a remote server the obtained information and the measured signal strength, in cellular form via the mobile cellular device, wherein prior to outputting the obtained information, the remote server lacks location data identifying the locations of the tag and the mobile cellular device; and
    outputting to the remote server the determined location of the mobile cellular device in order to enable the remote server to identify a current location of the tag based on the determined location of the mobile cellular device and the measured signal strength of the non-cellular data messages.

2. The computer-readable medium of claim 1, wherein the tag was further not previously associated with an access point.

3. The computer-readable medium of claim 1, wherein:
    the operations further comprise displaying the determined location of the tag.

4. The computer-readable medium of claim 1, wherein the non-cellular data messages comprise WLAN data messages.

5. The computer-readable medium of claim 4, wherein the tag is a WLAN tag that was not previously associated with the mobile cellular device.

6. The computer-readable medium of claim 1, wherein outputting comprises transmitting the information over a cellular network.

7. The computer-readable medium of claim 6, wherein outputting comprises sending, over the cellular network from the mobile cellular device, the information to a real-time location system.

8. The computer-readable medium of claim 1, further comprising displaying the obtained information on a display associated with the mobile cellular device.

9. The computer-readable medium of claim 1, wherein:
    the tag further comprises a tag sensor; and
    the data messages comprise tag sensor data representing at least one condition sensed by the tag sensor.

10. The computer-readable medium of claim 9, wherein the operations further comprise:
    decoding the data messages to obtain the tag sensor data; and
    performing an action based on the tag sensor data.

11. The computer-readable medium of claim 1, wherein:
    determining a location of the mobile cellular device comprises obtaining location information using a GPS sensor in the mobile cellular device.

12. The computer-readable medium of claim 1, wherein:
    identifying a location of the tag further comprises identifying a location of the tag relative to the mobile cellular device.

13. The computer-readable medium of claim 12, wherein the operations further comprise performing a search for the tag based on the identified location.

14. The computer-readable medium of claim 1, wherein the operations further comprise:
    estimating a distance of the tag relative to the mobile cellular device based on the measured signal strengths.

15. The computer-readable medium of claim 14, wherein the operations further comprise performing a search for the tag based on the estimated distance.

16. The computer-readable medium of claim 1, wherein the operations further comprise receiving, on a plurality of mobile cellular devices, data messages from the tag, the mobile cellular devices being configured to locate the tag using Received Signal Strength Indication (RSSI) triangulation.

17. The computer-readable medium of claim 1, wherein:
    the tag is a bi-directional tag; and
    the operations further comprise sending, from the mobile cellular device, a message to at least one of activate, deactivate, trigger, or program the tag.

18. The computer-readable medium of claim 1, wherein the operations further comprise configuring the mobile cellular device to associate and de-associate tags with at least one of an asset or a living thing.

19. A method for determining a location of a tag using a mobile cellular device, the method comprising:
    receiving, on a mobile cellular device, non-cellular data messages transmitted from the tag, the tag being:
        not previously associated with the mobile cellular device; and
        not associated with an access point;
    decoding the non-cellular data messages to obtain information relating to the tag;
    determining a location of the mobile cellular device;
    measuring a signal strength of the received non-cellular data messages;
    outputting to a remote server the obtained information and the measured signal strength, in cellular form via the mobile cellular device, wherein prior to outputting the obtained information, the remote server lacks location data identifying the location of the tag and the mobile cellular device; and
    outputting to the remote server the determined location of the mobile cellular device in order to enable the remote server to identify a current location of the tag based on the determined location of the mobile cellular device and the measured signal strength of the non-cellular data messages.

20. The method of claim 19, wherein the non-cellular data messages comprise WLAN data messages.

21. The method of claim 20, wherein the tag is a WLAN tag that was not previously associated with the mobile cellular device.

22. The method of claim 19, wherein outputting comprises transmitting the information over a cellular network.

23. A computer-implemented method comprising the following operations performed by at least one processor:
receiving, on a mobile cellular device, non-cellular data messages transmitted from a tag that was not previously associated with the mobile cellular device;
determining a location of the mobile cellular device;
measuring a signal strength of the received non-cellular data messages;
outputting to a remote server the obtained information and the measured signal strength, in cellular form via the mobile cellular device, wherein prior to outputting the obtained information, the remote server lacks location data identifying the location of the tag and the mobile cellular device;
outputting to the remote server the determined location of the mobile cellular device; and
receiving, on the mobile cellular device, an estimated location of the tag relative to the mobile cellular device based on the determined location of the mobile cellular device and the measured signal strength of the non-cellular data messages; and
outputting the estimated location via the mobile cellular device.

24. The method of claim 23, wherein the non-cellular data messages include WLAN data messages.

25. The method of claim 24, wherein the non-cellular device is a WLAN device.

26. The method of claim 23, wherein outputting includes transmitting the information over a cellular network.

27. The method of claim 23, wherein the estimated location of the tag relative to the mobile cellular device further comprises:
estimating the distance of the tag relative to the mobile device based on the measured signal strengths; and
estimating a location of the tag based on the estimated distance and determined location of the mobile device.

28. A tangible, non-transitory computer-readable storage medium storing instructions that, when executed by at least one processor, cause the at least one processor to perform operations for determining a location of a tag using a mobile cellular device, comprising:
receiving, on a mobile cellular device, WLAN data messages transmitted from the tag, the tag being not previously associated with the mobile cellular device;
decoding the WLAN data messages to obtain information relating to the tag;
determining a location of the mobile cellular device;
measuring a signal strength of the received non-cellular data messages;
outputting to a remote server the obtained information and the measured signal strength, in cellular form via the mobile cellular device, wherein prior to outputting the obtained information, the remote server lacks location data identifying the locations of the tag and the mobile cellular device; and
outputting to the remote server the determined location of the mobile cellular device in order to enable the remote server to identify a current location of the tag based on the determined location of the mobile cellular device and the measured signal strength of the non-cellular data messages.

29. The computer-readable medium of claim 28, wherein:
the operations further comprise displaying the determined location of the tag.

30. The computer-readable medium of claim 28, wherein the tag was further not previously associated with an access point.

31. The computer-readable medium of claim 28, wherein outputting includes transmitting the information over a cellular network.

32. The computer-readable medium of claim 31, wherein outputting includes sending, over the cellular network from the mobile cellular device, the information to a real-time location system.

33. The computer-readable medium of claim 28, further comprising displaying the obtained information on a display associated with the mobile cellular device.

34. The computer-readable medium of claim 28, wherein:
the tag further comprises a tag sensor; and
the data messages include tag sensor data representing at least one condition sensed by the tag sensor.

35. The computer-readable medium of claim 34, wherein the operations further comprise:
decoding the data messages to obtain the tag sensor data; and
performing an action based on the tag sensor data.

36. The computer-readable medium of claim 28, wherein the location of the mobile cellular device is obtained using a GPS sensor in the mobile cellular device.

37. The computer-readable medium of claim 28, wherein identifying a location of the tag further comprises identifying a location of the tag relative to the mobile cellular device.

38. The computer-readable medium of claim 37, wherein the operations further comprise performing a search for the tag based on the identified location of the tag relative to the mobile cellular device.

39. The computer-readable medium of claim 28, wherein the operations further comprise:
estimating a distance of the tag relative to the mobile cellular device based on the measured signal strengths.

40. The computer-readable medium of claim 39, wherein the operations further comprise performing a search for the tag based on the estimated distance of the tag relative to the mobile cellular device.

41. The computer-readable medium of claim 28, wherein the operations further comprise receiving, on a plurality of mobile cellular devices, data messages from the tag, the plurality of mobile cellular devices being configured to locate the tag using Received Signal Strength Indication (RSSI) triangulation.

42. The computer-readable medium of claim 28, wherein:
the tag is a bi-directional tag; and
the operations further comprise sending, from the mobile cellular device, a message to at least one of activate, deactivate, trigger, or program the tag.

43. The computer-readable medium of claim 28, wherein the operations further comprise configuring the mobile cellular device to associate and de-associate tags with an asset or a living thing.

* * * * *